No. 650,176. Patented May 22, 1900.
D. M. HOLMES.
DEPOSITING MACHINE FOR LIQUID CONFECTIONERY MATERIAL.
(Application filed Feb. 3, 1900.)
(No Model.) 3 Sheets—Sheet 3.
Fig. 4.
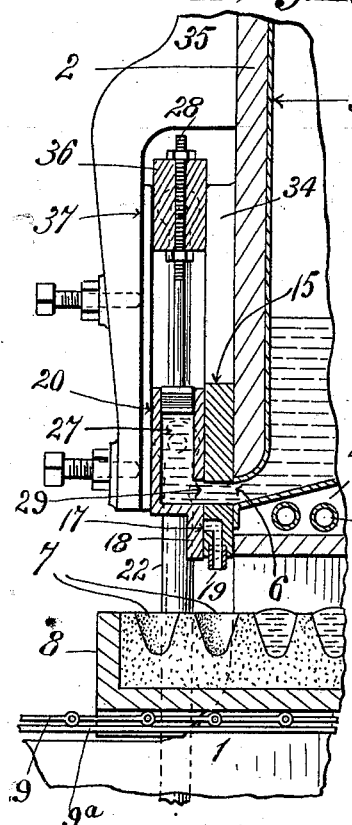
Fig. 5.
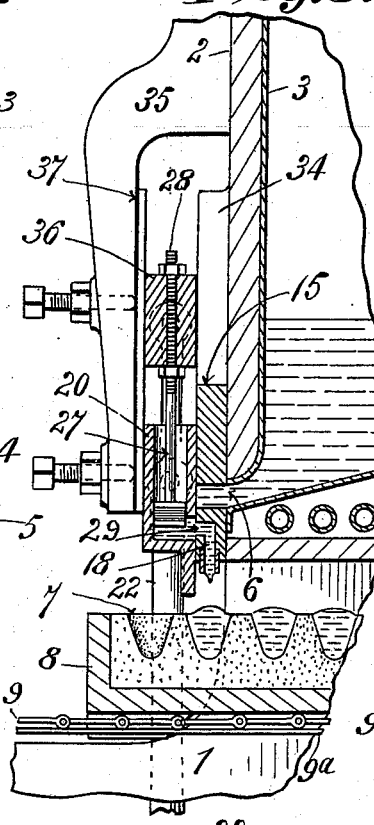
Fig. 6.
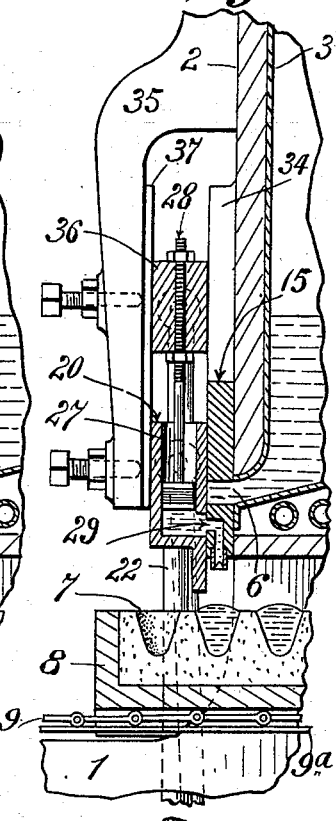
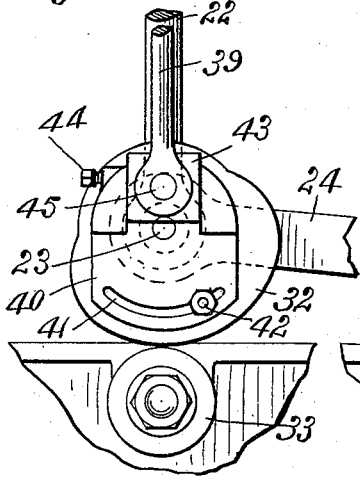
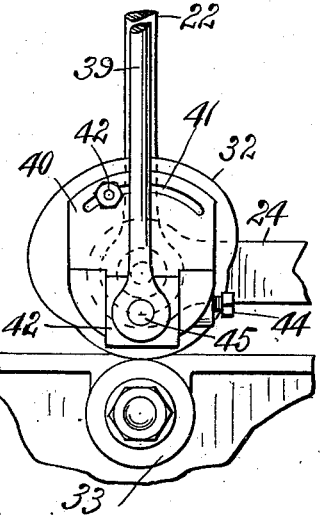
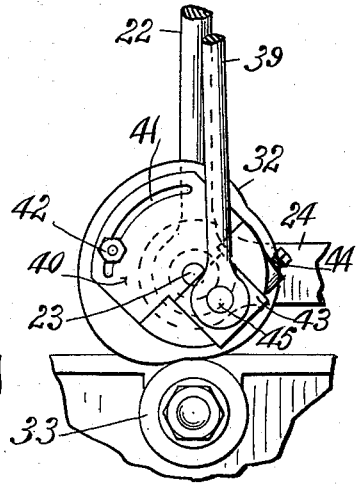
Witnesses:
J. D. Garfield
H. I. Clemons
Inventor,
Daniel M. Holmes.
by Chapin & Co.
Attorneys.

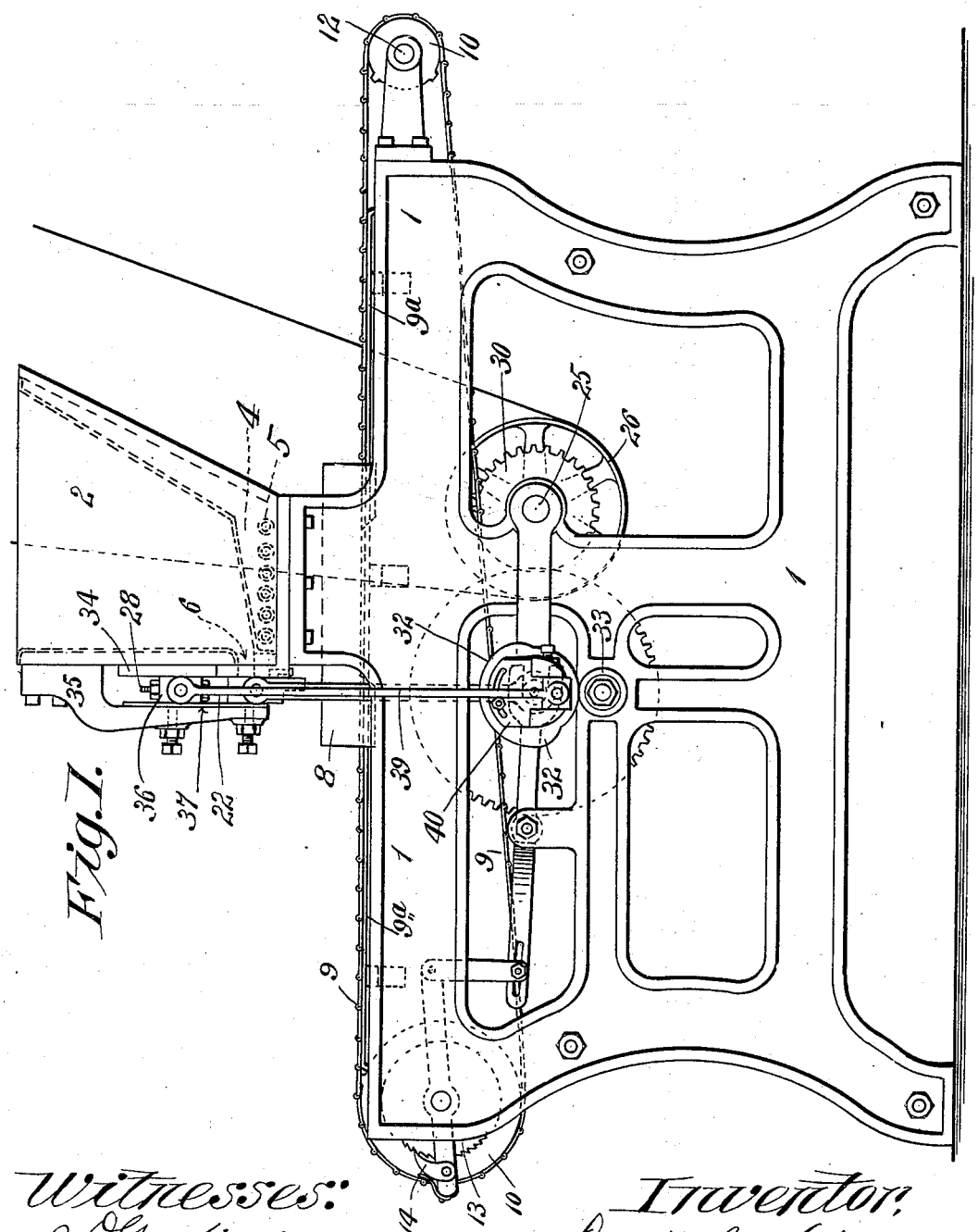

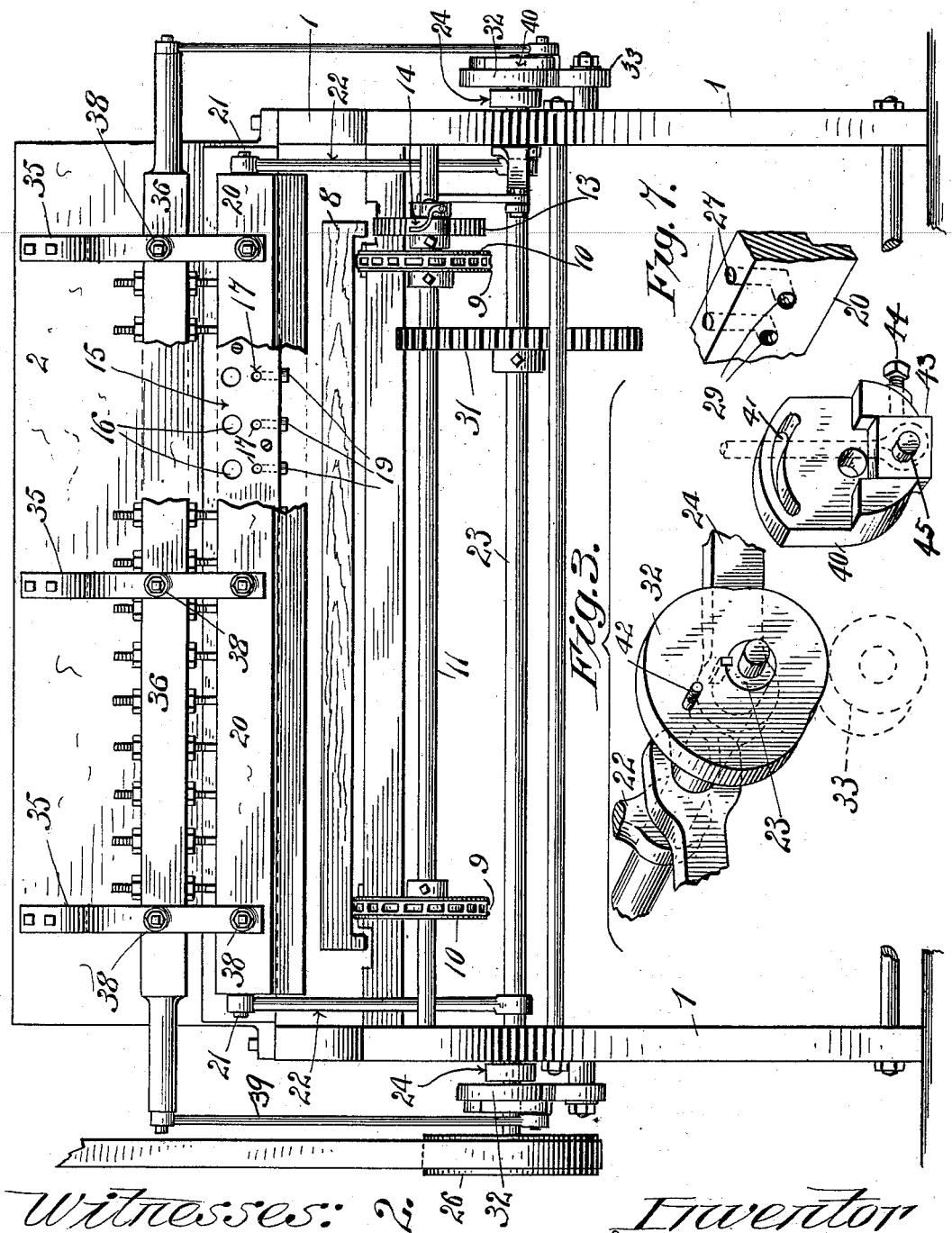

UNITED STATES PATENT OFFICE.

DANIEL M. HOLMES, OF ARLINGTON, NEW JERSEY.

DEPOSITING-MACHINE FOR LIQUID CONFECTIONERY MATERIAL.

SPECIFICATION forming part of Letters Patent No. 650,176, dated May 22, 1900.

Application filed February 3, 1900. Serial No. 3,881. (No model.)

*To all whom it may concern:*

Be it known that I, DANIEL M. HOLMES, a citizen of the United States of America, residing at Arlington, in the county of Hudson and State of New Jersey, have invented new and useful Improvements in Depositing-Machines for Liquid Confectionery Material, of which the following is a specification.

This invention relates to confectionery machinery, and more especially to machines for depositing liquid or plastic mixtures in molds formed in some suitable material, as starch; and one object of the invention is to produce a machine of this class which can be so adjusted as to unvaryingly deliver a desired quantity of material into said molds with great rapidity and at the same time cut off the supply of material absolutely during the interval elapsing between the filling of one mold or set of molds and the next, whereby the confectionery mixture is prevented from dripping and will not be drawn in strings from one mold or set of molds to another as they are moved under the depositing-apertures.

A further object of the invention lies in the construction and coöperative arrangement of the various parts of the depositing mechanism whereby their relative adjustment is adapted to vary the quantity of material delivered into the molds.

Another object of the invention lies in adapting the depositing mechanism to be quickly and easily removed from the machine and replaced with another adapted to different type of confections.

The invention consists in the construction, all as fully hereinafter described, and pointed out in the claims.

In the drawings forming part of this specification, Figure 1 is a side elevation of a machine embodying my invention. Fig. 2 is an end elevation of the same. Fig. 3 is a perspective view of a portion of the cam-shaft of the machine and showing in separated relations parts of the cam construction. Fig. 4 is a sectional elevation of that part of the machine which embodies the essential features of the invention and shows the position of the parts at the beginning of a depositing movement. Fig. 5 shows the same parts at the end of the depositing movement, and Fig. 6 shows the same parts in the position they assume at the moment the cutting off of the material takes place as the mold-tray is about to move to present a series of empty molds to be filled. Fig. 7 is a perspective view of a portion of the cylinder-plate of the machine.

This machine is in its general aspects similar in construction to machines of the same class heretofore constructed, the invention residing in the mechanism for receiving and depositing the confectionery material in the molds and in the devices for operating such mechanism.

The machine comprises a frame 1, on which is a tank 2 for receiving the confectionery mixture. This is a metal tank having a copper lining 3 and the usual chamber 4, in which steam-pipes 5 are located, whereby the mixture in the tank is kept in a state of proper fluidity by heat. The bottom of the tank is inclined toward the delivery side thereof, and a narrow slot 6 runs from one end of the tank to the other along its lowest edge. (See Figs. 4, 5, and 6, in which this slot is shown in cross-section.) The depositing mechanism receives the mixture through this slot 6 and deposits it in separate charges in molds 7, formed in some suitable material, as starch, contained in shallow wooden trays 8, which are moved under the depositing mechanism with a step-by-step movement, said molds being spaced to register with the discharge-apertures of the depositing mechanism, whereby each intermittent movement of said trays will bring a row of empty molds in position to receive all at the same time a suitable quantity of the confectionery mixture.

The proper movements of the trays are imparted thereto by two tray-carrying conveyer-chains 9, running over sprocket-wheels 10 on the transverse shafts 11 and 12, so located that the upper course of the chains will be slightly above the plane of the top of the frame of the machine. The chains are supported between the shafts on suitable strips 9ª lengthwise of the machine. On the shaft 11 is a ratchet-wheel 13, whose teeth are engaged by a swinging pawl 14, to which suitable vibratory movements are imparted, as described farther on.

Referring now to the depositing mechanism, a plate 15, of brass of suitable composition to adapt it to resist corrosion by contact of the confectionery mixtures, is screwed to the side of the tank 2 along its lower delivery edge covering the slot 6, and delivery-ports 16 are bored through this plate. These ports are so spaced as to correspond to the spacing between the molds. In line vertically with these ports 16 and below them a series of holes 17 are bored partly through said plate, and from the bottom edge of the latter and in the same vertical plane a series of holes 18 are bored to intercept the holes 17 at right angles. The open ends of the latter are counterbored to receive the short nipples 19, which are screwed therein and project somewhat below the lower edge of the plate. The outer surface of this plate is finished true and smooth, and a second plate 20 of substantially the same shape and size as the plate 15 is supported to slide vertically in contact with the latter. This plate 20 (made of the same metal as the plate 15) is supported by two trunnions 21, which pass through the upper end of two arms 22, the lower ends of which swing freely on a shaft 23, running across the machine and supported in bearings in the ends of two arms 24. (See Figs. 1 and 2.) These arms 24 are in turn supported at or near the opposite ends of the driving-shaft 25, which is provided with a driving-pulley 26 and a belt. This plate 20 has a series of holes 27 (which constitute cylinders, and is therefore hereinafter referred to as the "cylinder-plate") bored therein from the upper edge downward nearly to the lower edge of the plate at points directly opposite the ports 16 and adapted to receive the pistons 28, which fit closely therein. At the lower extremity of these holes they are tapped transversely by passages 29, extending through to the plate 15. The shaft 23 is the cam-shaft of the machine, the cams being located on the outer end of the shaft, which projects through the frame of the machine. This shaft has no bearing in the frame of the machine and is maintained in alinement only by the engagement thereof with the arms 24, hung on the driving-shaft, and is adapted to move with those arms in a plane concentric with the axis of the latter.

A gear 30 on the driving-shaft and shown only in Fig. 1 engages another gear 31, secured on the shaft 23, and imparts constant rotary movements to the latter, and as the arms 24 are adapted to swing in a circle concentric with the gear 30 the rotary movements imparted to said shaft 23 will not be interrupted through a change of position of the latter by reason of the swinging movement of said arms. The cams 32, secured to the ends of the said shaft 23, have a constant rotary movement and bear on cam-rolls 33, which are supported on the outside of the frame and are clearly shown in all the figures. The function of these cams 32 (both of which are keyed on the shaft 23 in the same position) is to impart to the cylinder-plate 20 a vertical sliding movement relative to the plate 15, whereby the passages 29 at the base of the holes 27 will be brought into registering position with the delivery-ports 16 when the cylinder-plate 20 is in its highest position and with the holes 18 when the said plate 20 is in its lowest position, and when said passages 29 are in registering position with one the face of the plate cuts off communication with the other.

Vertical ribs 34 are cast on the side of the tank 2, and their outer surfaces lie in the same plane as the outer surface of the plate 15, and the inverted bracket-arms 35 are secured by their upper ends to the side of the tank above said ribs and depend parallel therewith to near the bottom edge of the tank. Between the said ribs 34 and the inner surface of said bracket-arms 35 is the piston-bar 36. These bracket-arms are provided with the bearing-plates 37, which are set up to a proper bearing against said piston-bar by the adjusting-screws 38. Holes are bored through the said piston-bar 36, axially in line with the holes 27, and the pistons 28 are adjustably secured therein by screwing them up and down through the piston-bar and locking them by suitable nuts in the desired position. This piston-bar 36 has a vertical reciprocating movement between the bracket-arms 35 and the ribs 34, and a part of this movement is simultaneous with that of the cylinder-plate 20, and a part of it is independent of said plate. These movements of the piston-bar are imparted thereto by its connection with the cams 32 through the medium of the arms 39, pivotally attached to the ends of said piston-bar and extending down to the rotatably-movable plates 40, (see Fig. 3,) with which the lower ends of said arms have a pivotal connection. Said plates 40 are supported and are rotatable on the ends of the cam-shaft 23, close to the side of the cams 32, and are provided with a concentric slot 41, through which a bolt 42, fixed in said cam, projects. A nut on said bolt provides means for locking the plate in whatever position it may be desired to place it relative to a given point on said cam, and whereby it is made to rotate with said cam. Between two projections on the plate 40 the block 43 is placed and is locked therebetween by a bolt 44, and the lower ends of the arms 39 are pivotally supported on a stud 45 on this block. This stud is eccentric to the cam-shaft 23, and the block being adjustable radially of the cam 32 said eccentricity may be increased or diminished by loosening the bolt 44 and sliding the block 43 to the point desired.

The relative movements of the plates 15 and 20 are as follows, which, being described, will make clear the purpose of the adjustment of the block 43: Assuming that the parts are in the position shown in Fig. 5, in which they are left after having deposited a charge of mixture in the mold, the first movement of the machine will, by the movement of the cams 32 from the position of Fig. 5 to that of Fig. 6, cause a slight upward movement of the piston-bar 36, while the cylinder-plate 20 remains stationary, and this movement draws whatever mixture may adhere to the orifice of the nipples 19 from the preceding depositing operation back into the latter, and thus prevents any drip therefrom from extending from one row of molds to another during the movement of the tray 8 through the machine. From the position of the parts in Fig. 6, where the eccentric portions of the cams 32 begin to bear on the rolls 33, both the cylinder-plate 20 and the piston-bar 36 rise simultaneously; but the latter rises faster than the said plate 20. The first movement of the cylinder-plate 20 cuts off the holes 17 and brings the passages 29 into registering position with the delivery-ports 16, whereby the more rapid rise of the piston-bar referred to causes the pistons 28 to draw mixture from the tank by suction. The end of this movement and the extreme upward position of the cylinder-plate 20 and piston-bar are shown in Fig. 4. From this point the said parts begin their descent in unison, the cylinder-plate 20 cutting off the ports 16 and bringing the passages 29 into registration with the holes 17, and the piston-bar 36, moving faster than said plate, continues its downward movement to the point shown in Fig. 5 after the cams run off from the eccentric onto the concentric part thereof. This completes one complete revolution of the cams and effects the charging of the cylinders with mixture and the discharge thereof into the molds, the cylinder-plate 20 being so timed in its movements as to open and close the ports 16 and passages 17 at the proper time. The degree of movement of the cylinder-plate 20 is not altered by the adjustment of the piston-bar relative thereto, the said adjustment being effected by increasing or diminishing the distance of the stud 45 from the axis of the cams. Thus though the degree of the movement of said piston-bar is variable the time of the relative movements of the two parts remains unchanged, and the pistons can thus be adjusted to draw in and discharge any quantity of material from nothing to the full capacity of the cylinders.

If for any reason it is desired to vary the time of the beginning of the vertical movements of the piston-bar relative to the plate 20, this may be effected by loosening the nut on the bolt 42 and by turning the plate 40 on its axis, whereby its position relative to the intersection of the concentric and eccentric portions of the cam 32 may be changed. As an example of this adjustment, suppose it is desired to alter the time of the beginning of the upward movement of the piston-bar relative to the movement of the cylinder-plate 20 in the same direction the time of this movement of said bar may be retarded by rotating the bottom of the plate 40 farther to the right and it may be advanced by rotating the plate farther to the left of the position it occupies in said figure.

It has been said that the tray-carrying conveyer-chains 9 9 have an intermittent movement through the machine and that these chains have this movement imparted to them by a pawl-and-ratchet device on one of the shafts, as 11, which supports the chains. This chain-operating mechanism comprises a pawl-lever 47, hung on the shaft 11, having the swinging pawl 14 on its outer end held in engagement with the teeth on the ratchet-wheel by a suitable spring 48. A link 49 connects the inner end of this pawl-lever to one end of a rocking lever 50, supported on a stud 51, the opposite end of this lever being forked and engaging the cam-shaft 23, whereby the vertical movements of the latter impart vertical oscillations to said lever 50, thus operating the pawl-lever. To provide means for varying the throw of the pawl-lever, the lever 50 is slotted at the point of its engagement with the link 49, and by adjusting said link lengthwise of said lever and securing it in place the throw of the pawl-lever may be varied.

Having thus described my invention, what I claim, and desire to secure by Letters Patent of the United States, is—

1. In a machine of the class described, a supply-tank and an exit-port therein; a cylinder-plate having a passage communicating with the inner end of the cylinder therein; a discharge-nipple located near said port in said tank; a piston for the cylinder in said plate; means for moving said piston and cylinder-plate in unison to effect the registration of the passage in said cylinder-plate, either with said exit-port or with said discharge-nipple, and for moving said piston independently during the charging and discharging of the cylinder, substantially as described.

2. In a machine of the class described, a supply-tank and an exit-port therein; a cylinder-plate having a passage communicating with the inner end of the cylinders in said plate; a discharge-nipple located near said port in said tank; a piston for the cylinder in said plate; means for moving said piston and cylinder-plate in unison to effect the registration of the passage in the cylinder-plate, either with said exhaust exit-port or with said discharge-nipple, and for imparting to said piston a partial inspiratory stroke prior to the movement of the piston and cylinder-plate out of a position of communication of the latter with said nipple, substantially as described.

3. The combination with the supply-tank of a depositing-machine, of a mold-charging cylinder-plate, means for moving the latter relative to said tank whereby the cylinder in said plate is adapted to receive confectionery mixture, a piston in the cylinder in said plate adapted to eject the contents of the cylinder into a mold, and means for imparting to said piston a slight backward movement at the end of its ejecting operation, whereby any of the contents of the cylinder at the point of exit therefrom may be drawn inward, substantially as described.

4. In a depositing-machine for liquid confectionery mixtures comprising a supply-tank, exit-ports therefrom, and discharge-nipples thereon in proximity with said ports but not communicating therewith, the combination with a cylinder-plate having a sliding movement on said tank, passages in said plate, and means for moving the latter alternately into registering position with said ports and nipples, whereby when said passages are in communication with said ports, the passages through the nipples will be closed, and vice versa, substantially as described.

5. In a machine of the class described, a cylinder-plate, pistons in the cylinders in said plate, a supply-tank containing liquid confectionery material, exit-ports from said tank, discharge-nipples near the latter, means for moving said plate to adapt the cylinders therein to receive mixture from said tank and to discharge it through said nipples, and means operated by the movement of the cylinder-plate to effect the closure of said exit-ports during the discharge of the cylinders, and to effect the closure of the passage through said nipples during the charging of the cylinders, substantially as described.

6. In combination with the supply-tank of a confectionery-depositing machine, a port in the lower edge of the tank, a movable cylinder-plate, a passage through the wall of the latter communicating with the inner end of the cylinder in said plate, a discharge-nipple near said port, and means for moving the cylinder-plate to successively cover said port and effect the registration of said passage and discharge-nipple, and to close the passage through the nipple and effect the registration of said port with the passage into the cylinder in said plate, substantially as described.

7. A depositing-machine for liquid or plastic confectionery mixtures, comprising a tank for holding a quantity of said mixture, a cylinder-plate, cylinders bored therein, passages from the latter through said plate, a piston-bar, pistons secured thereto and adapted to play in said cylinders, exit-ports from said tank, discharge-nipples in proximity to said ports and cut off from communication with said exit-ports, means for moving said cylinder-plates, whereby the passages from the cylinders therein are alternately brought into registration with said ports and with said nipples, and means for moving the piston-bar whereby a quantity of mixture from said tank may be drawn into the cylinders in said plate on one stroke of the piston-bar and on the return stroke of said bar discharge therefrom to said nipples, substantially as described.

8. In a depositing-machine for liquid confectionery, comprising a cylinder-plate having a series of cylinders therein, a bar having a series of pistons attached thereto adapted to play in said cylinders, a series of passages leading from said cylinders through the wall of said cylinder-plate, and means for moving the latter and said bar reciprocatingly in unison during a part of their movement, and one faster than the other during another part thereof, whereby said pistons are adapted to draw in and to discharge a liquid through said passages leading from said cylinders, substantially as described.

9. The combination, in a machine of the class described, comprising a plate having a series of mold-charging cylinders therein, pistons for said cylinders, and a supply-tank; of a cam-shaft and cams thereon adapted to impart reciprocal movements to said pistons and cylinder-plate in unison and to said pistons independently of said cylinder-plate, said cams consisting of fixed members for imparting the movements in unison of said pistons and cylinder-plate, and other members adjustable on said fixed members adapted to impart said independent movement to the pistons, and to vary the time and degree of said movement, substantially as described.

10. In a machine of the class described, a cylinder-plate having a series of cylinders therein, a series of pistons in said cylinders secured to a bar whereby they are adapted to be moved in unison in the cylinders in said plate; a cam-shaft, cams thereon operating against a fixed point whereby said cam-shaft may be reciprocally actuated; connecting-arms from said cam-shaft to said cylinder-plate, and other connecting-arms extending from eccentrically-located studs on said cams to said piston-bar, whereby said bar and cylinder-plate are adapted to be moved in unison by the reciprocal action of said cam-shaft, and said bar moved independently of the cylinder-plate by the rotation of said cam-shaft; in combination with means for rotating the cam-shaft and for varying the eccentricity of said studs relative to said cam-shaft, substantially as described.

11. A depositing-machine for liquid confectionery mixtures comprising a series of trays, confectionery-receiving molds formed in suitable material in said trays, in equidistant rows, mechanism for moving said trays step by step through the machine; a tank, discharge-nipples on said tank adapted to register with said molds, exit-ports from said tank, a cylinder-plate having a series of cylinders therein, and pistons in said cylinders, the latter constituting movable connections between said exit-ports and discharge-nipples and adapted to receive material from said ports and discharge it through said nipples and to open and close said ports and nipples at the proper time, for the purpose set forth.

DANIEL M. HOLMES.

Witnesses:
 EDW. L. WATERBURY,
 J. T. RYDER.